US010045156B2

(12) United States Patent
Malone et al.

(10) Patent No.: US 10,045,156 B2
(45) Date of Patent: Aug. 7, 2018

(54) PHYSICAL SECURITY SYSTEM AND METHOD

(71) Applicants: David Thomas Malone, West Hartford, CT (US); John Harold Malone, West Hartford, CT (US)

(72) Inventors: David Thomas Malone, West Hartford, CT (US); John Harold Malone, West Hartford, CT (US)

(*) Notice: Subject to any disclaimer, the term of this patent is extended or adjusted under 35 U.S.C. 154(b) by 0 days.

(21) Appl. No.: 15/569,205

(22) PCT Filed: May 9, 2016

(86) PCT No.: PCT/US2016/031476
§ 371 (c)(1),
(2) Date: Oct. 25, 2017

(87) PCT Pub. No.: WO2016/183010
PCT Pub. Date: Nov. 17, 2016

(65) Prior Publication Data
US 2018/0103348 A1    Apr. 12, 2018

Related U.S. Application Data

(60) Provisional application No. 62/158,665, filed on May 8, 2015.

(51) Int. Cl.
*H04W 24/00* (2009.01)
*H04W 4/02* (2018.01)
(Continued)

(52) U.S. Cl.
CPC ............... *H04W 4/025* (2013.01); *G01S 1/02* (2013.01); *H04W 24/10* (2013.01);
(Continued)

(58) Field of Classification Search
CPC ....... H04W 4/02; H04W 24/10; H04W 64/00; H04W 4/80; H04W 4/008; H04W 4/025;
(Continued)

(56) References Cited

U.S. PATENT DOCUMENTS 6,950,020 B2 * 9/2005 Shimamoto ........... B60R 25/102
340/425.5
7,123,145 B2 * 10/2006 Reilly ..................... G01S 13/56
340/552

(Continued)

FOREIGN PATENT DOCUMENTS

| CN | 103024896 A | * | 4/2013 | |
| EP | 2441279 A2 | * | 4/2012 | ........ H04M 1/72566 |
| WO | WO 2010144651 A2 | * | 12/2010 | ........ H04M 1/72566 |

*Primary Examiner* — Mahendra Patel
(74) *Attorney, Agent, or Firm* — Alix, Yale & Ristas, LLP

(57) ABSTRACT

Systems (100) and methods (110) for operating a physical security surveillance system. The methods involve: detecting the constant unencrypted radio transmissions of mobile phones in order to capture in a cloud-based archive the identities, geographical trails, speeds and motions of most people nearby deployed units. Once recorded by a locally deployed sensor (104), the aggregated data (102) from the recorded mobile phones (106) is pooled in a globally inclusive database, synthesized, processed and filtered. On a paid-subscription basis, the data is accessible in a searchable archive that includes dozens of search parameters and filters. Users may visualize geographical trails of mobile phones on a multi-featured map, a geographically corresponding input of Google Street View, or a geographically corresponding input of video surveillance. Users may receive text message alerts when designated blacklisted individuals trespass in designated surveillance zones.

18 Claims, 10 Drawing Sheets

GENERAL OPERATIONAL ILLUSTRATION

(51) Int. Cl.
*H04W 24/10* (2009.01)
*H04W 64/00* (2009.01)
*G01S 1/02* (2010.01)
H04L 29/08 (2006.01)
H04W 4/00 (2018.01)
H04W 4/80 (2018.01)

(52) U.S. Cl.
CPC ........... *H04W 64/003* (2013.01); *H04L 67/18* (2013.01); *H04W 4/008* (2013.01); *H04W 4/80* (2018.02)

(58) Field of Classification Search
CPC ......... H04W 64/003; G01S 1/02; H04M 1/66; H04M 1/72572; H04L 67/18; H04Q 7/20
USPC ..................... 455/456.1, 410, 404.2; 370/315
See application file for complete search history.

(56) References Cited

U.S. PATENT DOCUMENTS

| | | | |
|---|---|---|---|
| 7,177,623 B2 * | 2/2007 | Baldwin | H04W 4/90 455/404.2 |
| 7,873,349 B1 * | 1/2011 | Smith | H04M 1/72577 455/410 |
| 2006/0061654 A1 * | 3/2006 | McKay | G08B 13/19602 348/143 |
| 2008/0198001 A1 * | 8/2008 | Sarma | G01S 1/68 340/539.1 |
| 2008/0201076 A1 | 8/2008 | Huang et al. | |
| 2009/0160673 A1 * | 6/2009 | Cirker | G07C 9/00111 340/12.22 |
| 2009/0325598 A1 * | 12/2009 | Guigne | G01S 5/021 455/456.1 |
| 2010/0317371 A1 * | 12/2010 | Westerinen | H04M 1/72566 455/456.6 |
| 2012/0274775 A1 * | 11/2012 | Reiffel | G06Q 30/0241 348/158 |
| 2012/0314063 A1 * | 12/2012 | Cirker | G08B 13/19652 348/143 |
| 2013/0217332 A1 * | 8/2013 | Altman | H04H 60/90 455/41.2 |
| 2014/0227671 A1 * | 8/2014 | Olmstead | G11B 27/10 434/308 |
| 2014/0235269 A1 * | 8/2014 | Ericsson | H04W 64/003 455/456.1 |

* cited by examiner

LEGEND FOR OPERATIONAL ILLUSTRATION

= A single phone and geographical trail transmitted from a wireless device

= Every phone and geographical trail recorded on a single sensor

= The global synchronized logs of phones detected by every sensor along with all of the associated composite trails

EVENT LOGS

| EVENTS 500 | | | | | CONFIGURATION 502 | | | | | | | |
|---|---|---|---|---|---|---|---|---|---|---|---|---|
| LOGS 504 | | | SEARCH 506 PARAMETERS | | LISTS 508 | | | | | MAPS 510 | | |
| TIME ↓ 511 | SERIAL NUMBER 512 | DURATION 514 | LOCATION 516 | VELOCITY (MPH) 518 | CENTER 520 | PROXIMITY (FT.) | LIST OPTIMAND (REGO.) | RADII PID | OVERLAP | IN FREQUENT | FASTED | ASSOC. | SIGNAL |
| | | | | | | 52 2 | 52 4 | 52 6 | 52 8 | 53 0 | 53 2 | 5 3 4 | 5 3 6 | LOSS 538 |
| 10/31/14 23:08:09 | DC-9B-9C-60-3E-38 V | 5 m 33 s | 41.760412, -72.733007 | 0 | 41.760411, -72.733009 | 15 | * | * | * | * | * | * | * |
| 10/31/14 23:08:09 | CC-C3-EA-42-59-94 V | 5 m 33 s | 41.760412, -72.733007 | 0 | 41.760411, -72.733009 | 15 | * | * | * | * | * | * | * |
| 10/31/14 23:08:09 | 28-E0-2C-0B-92-B2 V | 5 m 33 s | 41.760412, -72.733007 | 0 | 41.760411, -72.733009 | 15 | * | * | * | * | * | * | * |
| 10/31/14 23:15:27 | F0-25-B7-38-A4-C8 V | 8 m 22 s | 41.760487, -72.733098 | 0 | 41.760411, -72.733009 | 47 | * | * | * | * | * | * | * |

| JUMP TO THE NEXT PAGE 540 | JUMP TO THIS PHONE 544 (Enter Partial Number Or Enter / Paste Complete Number) | PERMANENTLY SAVE THESE LOGS 546 | VIEW PERMANENTLY SAVED LOGS 547 |
|---|---|---|---|
| JUMP TO THIS TIME V 542 | | BLACKL. IT 548 | WHITEL. IT 550 |

FIG. 5

SEARCH-PARAMETERS CONTROL PANEL

| | EVENTS | | CONFIGURATION | |
|---|---|---|---|---|
| LOGS | SEARCH PARAMETERS | LISTS | MAPS | |
| DISPLAY | PARAMETER 602 | RANGE FILTER 604 | DEFINITIVE FILTER 606 | OPTIONS 608 |
| ☑ 600 | Event Time 610 | 10/31/14 23:00:00 v -- 10/31/14 23:59:59 v | | ☐ Group By Phone 658 |
| ☑ | Visit Duration 612 | ≤ v 20 minutes v | | ☐ Segregate Visits 660 |
| ☐ | Dupl. Interval 614 | | v | |
| ☐ | Blink Rate 616 | | | |
| ☑ | Serial # 618 | Blacklist + More Phones v | DC-9B-9C-60-3E-38.... v | |
| ☑ | Dev. Location 620 | | | |
| ☑ | Velocity 622 | ≤ v 20 MPH v | Unit Location v | |
| ☑ | Cen. Location 624 | ≤ v 30 meters v | v | |
| ☑ | Proximity 626 | | v | |
| ☑ | Lingering 628 | | v | |
| ☑ | Stop-and-Go 630 | | v | |
| ☑ | Rapid Accel. 632 | | v | |
| ☑ | Overlapping 634 | | Enable v | |
| ☑ | Infreq. Visitor 636 | | v | |
| ☐ | Freq. Visitor 638 | | v | |
| ☑ | Freq. Traj. De. 640 | | v | |
| ☑ | Associates 642 | Blacklist + Infrequent Visitors + More Phones v | DC-9B-9C-60-3E-38.... v | ☑ Only Show Assoc. 662 |
| ☑ | Signal Loss 644 | | | |
| ☐ | Average Speed 646 | --- v --- | v | |
| ☐ | Exclu. Phones 648 | v | | |

| GET LOGS 650 | UPDATE EXISTING LOGS 652 | SAVE THESE 654 | SAVED PARAMETERS 656 |

FIG. 6

LISTS CONTROL PANEL

| 700 | EVENTS | | CONFIGURATION | |
|---|---|---|---|---|
| | LOGS | SEARCH PARAMETERS | LISTS | MAPS |
| | | BLACKLIST 702 | WHITELIST 704 | |
| ACTIONS | | | | |
| View Group 706 | ☐ Edit List of All Blacklisted Individuals 710 | | ☐ Edit List of All Whitelisted Individuals 712 | |
| | ☐ Edit Blacklisted Profiles Monitored by Text Alerts 714 | | ☐ Edit Whitelisted People Monitored by Text Alerts 716 | |
| Include... | ☐ All Infrequent Visitors On Blacklist 718 | | ☐ All Frequent Visitors On Whitelist 720 | |
| Search... | ☐ For Phones Of Known Individual To Blacklist 722 | | ☐ For Phones Of Known Individual To Whitelist 724 | |
| Text Alerts 708 | ☑ Activate 726 <br><br> 1. Recipient Phone #'s    860-614-4086 <br> 2. Targeted Phone    F0-25-B7-38-A4-C8: v <br>     ☐ Entire Blacklist    ☐ Individualize Zones <br> 3. Principal Center of Surveillance Zone 728 <br>     ☑ Fixed Coordinates <br>     (Input manually, paste or select from no-go-zones list) <br>     41.760411, -72.733009    My Stationary Sensor v <br>     ☑ Mobile Coordinates <br>     (Smart phone or Portable Sensor number) <br>     B4-C7-99-F5-2D-8C <br> 4. Proximity   < 50 ft. v 730 | | ☑ Activate 732 <br><br> 1. Recipient Phone #'s    860-614-4086 <br> 2. Targeted Phone    80-96-B1-C2-CE-BD <br>     ☐ Entire Whitelist    ☐ Individualize Zones <br> 3. Surveillance Zone 734 <br>     ☑ Coordinates <br>     41.760411, -72.733009 <br>     Proximity   > 100 ft. v 736 <br>     ☐ Region <br>       ☐ City              v <br>       ☐ State            v <br>       ☐ Country       v | |
| View Alert Events | ☐ Open Blacklist Text-Alert Historical Events Window 738 | | ☐ Open Whitelist Text-Alert Historical Events Window 740 | |
| Request More Data | ☐ Use Data Broker To Request More Information 742 | | ☐ Use Data Broker To Request More Information 744 | |

FIG. 7

BLACKLIST PROFILE PAGE

Jose "Chuck" Santiago

| | | ☐ Identify Owner | ☐ Enable Text Alerts For This Phone |
|---|---|---|---|
| *Serial #* | F0-25-B7-38-A4-C8 | | |
| *Name* 800 | Jose "Chuck" Santiago | | |
| *Aliases* | Chuck; The Informer; 9-1-1 | | |
| *Associates* | ☐ View Saved Profiles Of Associates CC-C3-EA-42-59-94; DC-9B-9C-60-3E-38; 28-E0-2C-0B-92-B2 | | |
| *Probable Residence* 802 | 10 Park Rd., West Hartford CT 06118 | | |
| *Associated Cars* | 431 BMX – Black Civic (Chuck's); 221 FRE – Red Camry (friend's) | | |
| *Physical Description* | ☐ View Saved Photos And Videos 40-year old Latino male, black hair, mustache, 6 ft., "Born To Squeal" tattoo on neck | | |
| *Saved Logs* 803 | ☐ View | | |
| *GPS-Trail Maps* | ☐ View 805 | | |
| *Frequented Locations* 807 | ☐ View | | |
| *Videos Of Crimes* | ☐ View | | |
| *Text Alerts* 808 | ☐ View | | |
| *Additional Information* | On April 1, 2010, Chuck was arrested at his residence by the West Hartford police for possession with intent to distribute crack cocaine after reporting to the WHPD that two of his customers had pistol-whipped him and robbed him at gunpoint. The WHPD dropped charges against Chuck after he agreed to inform on his criminal associates. Chuck appears to have continued to sell crack. <u>VIEW ALL BELOW</u> | | |

| SAVE UPDATED PROFILE 804 | | SHARE PROFILE 806 |

FIG. 8

MAPS CONTROL PANEL

| LOGS | EVENTS | | CONFIGURATION | |
|---|---|---|---|---|
| | SEARCH PARAMETERS | LISTS | | MAPS |
| FEATURES 900 | SPECIFICATIONS 902 | | | |
| Area 904 | ☐ Use Surveillance Zone Specified In Search Parameters 910 | | | |
| | ☐ Select Using Map Zoom Tool 912 | | | |
| Geographical Trails 906 | ☐ Use Time Frame And Phones Specified In Search Parameters 914 | | | |
| | ☐ Use Time Frame And Phones Specified Below 916 | | | |
| | Time Frame _____ ∨ | | | |
| | Phones _____ | | | |
| Superimposed Features 908 | ☐ Known Video Surveillance Locations Along Geographical Trails 918   ☐ Current Location 923 | | | |
| | ☐ Frequented Locations Of Specified Phones On The Map 920   ☐ Highlight Probable Residence 922 | | | |
| | ☐ Unrecorded Parts Of The GPS Trails Populated With Data Purchased From Data Brokers 924 | | | |

| VIEW THIS MAP 926 | VIEW SAVED MAPS 928 | STREET VIEW 930 | VIDEO 932 |
|---|---|---|---|

FIG. 9

CONFIGURATION CONTROL PANEL

| 1000 | EVENTS | | CONFIGURATION |
|---|---|---|---|
| *RECORDING FUNCTIONS* | | *SEARCH PARAMETERS* 1002 | |
| Minimum Time Interval To Record<br><br>Duplicate Events Generated By The Same Device:<br><br>1 second v<br><br>1004 | Time Frame:<br><br>Min. Time Interval To Display<br><br>Dup. Events:<br><br>Lingering:<br><br>Rapid Acceleration:<br><br>Infrequent Visitor:<br><br>Frequent Visitor:<br><br>FTD:<br><br>Associates:<br><br>Signal Loss: | Entire Archive v  1006<br><br>5 minutes v  1008<br><br>Stationary for > 5 seconds v  1010<br><br>Quadrupling v speed in one second  1012<br><br>Recorded on average < 5 minutes v per day  1014<br><br>Recorded on average > 5 minutes v per day  1016<br><br>Deviates from trajectory by > 2 meters v on > three v occasions  1018<br><br>Lingers within 1 meter v of designated phone or other associates > 5 seconds v  1020<br><br>Phone within surveillance zone ceases to beacon for a period > 1 minute v  1022 | |

SAVE THESE SETTINGS 1024        REVERT TO DEFAULTS 1026

FIG. 10

PHYSICAL SECURITY SYSTEM AND METHOD

CROSS REFERENCE TO RELATED APPLICATIONS

This application claims priority from U.S. Provisional Application No. 62/158,665 filed on May 8, 2015, which is herein incorporated in its entirety.

STATEMENT OF THE TECHNICAL FIELD

The inventive arrangements relate to systems and methods for operating a physical security surveillance system. More particularly, the inventive arrangements relate to systems and methods for detecting the constant unencrypted radio transmissions of mobile phones in order to capture in a cloud-based archive the identities, geographical trails, speeds and motions of most people nearby deployed units.

DESCRIPTION OF RELATED ART

Currently there exists no commercially available technology for recording the constant unencrypted radio transmissions of mobile phones for the purpose of physical security surveillance. Mobile-phone tracking technology is employed for marketing purposes inside retail stores, but identification is based on the phone owner voluntarily identifying himself, and the scope of the surveillance is limited to inside the store or mall. Law enforcement agents with court orders can access the individually separate databases of wireless service providers based on the condition that these agents previously identify the person of interest, but location-based searches of crime scenes are not possible via these databases. Alternatively, law enforcement agents with a court order can peruse thousands of cell phone records from a "cell tower dump" generated by a local cell tower, though the locational accuracy of the records is as great as a one-half mile radius and the recorded signals are limited to cellular beacon signals and do not include Wi-Fi and Bluetooth beacons, which are more accurate in pinpointing the phone's time-stamped location. Alternatively, law enforcement agents with or without a court order can deploy "IMSI (International Mobile Subscriber Identity) catchers" that hack the phones of everyone in the vicinity in order to conduct local physical surveillance of mobile-phone users, though these systems often involve illegal methods of surveillance that renders any resulting data useless for admissibility in a court of law. Moreover, IMSI catchers can only be deployed in a local area and do not have the ability to pool data from multiple IMSI catchers deployed across a long distance, nor does the data processing capability of the systems produce an abundant variety of identifying and locational data useful to investigators.

Currently, there exists no way to identify and track criminals at a plethora of crime series throughout the developed world by deploying a hybrid identification and locational mobile-phone-tracking system. The logistical difficulty in executing an ex-parte court order for the account information associated to a Media Access Control (MAC) address, the widespread absence of MAC-address recorders and the ability to fake broadcasted serial numbers has discouraged the technology in the absence of a locational-based mobile-phone tracking system that pools data from a vast deployed network of mobile-phone sensors.

Also, there is no commercially available capability unifying the aforementioned recorded geographical trails of mobile-phone users with maps and local video surveillance for purposes of physical security surveillance. Moreover, there exists no capability for receiving text-message alerts when blacklisted individuals trespass in surveillance zones or in close proximity to selected individuals concurrently monitored by a mobile-phone-tracking system. Additionally, there currently exists no capability for employing such technology in order to track criminal associates and witnesses in cases of unidentified criminal perpetrators. Also, there exists no current mobile-phone-tracking physical security surveillance technology that can reliably track mobile-phone users who employ encryption programs to mask metadata beacons from law enforcement.

SUMMARY OF THE INVENTION

The present invention concerns systems and methods for detecting the constant unencrypted radio transmissions of personal mobile communications devices such as phones in order to capture in a cloud-based archive the identities, geographical trails, speeds and motions of most people nearby deployed processing units. Once recorded by a locally deployed sensor, the aggregated data from the recorded mobile phones is pooled in a globally inclusive database, synthesized, processed and filtered. On a paid-subscription basis, the data is accessible in a searchable archive that includes dozens of search parameters and filters. Users may visualize geographical trails of mobile phones on a multi-featured map, a geographically corresponding input of Google Street View, or a geographically corresponding input of video surveillance. Users may receive text message alerts when designated blacklisted individuals trespass in designated surveillance zones.

In one aspect, the invention is directed to a method for recording movement of a mobile communications device that emits a unique device ID. At a first known geographic location, the emitted ID is sensed. The sensed ID is transmitted at the first geographic location to a global communications network. At a second known geographic location, the same emitted ID is sensed. This sensed ID is transmitted to a public or private global communications network. At a central facility remote from the first and second geographic locations, the transmitted ID's are sensed and data are recorded indicative of the presence of the device at each of the first and second locations.

In another aspect, the invention is directed to a method for identifying the owner of a mobile communications device that emits a unique device ID assigned to the device. At a known geographic location having an ID sensing field, any IDs emitted within the field are continually sensed by any number of devices. The sensed ID's are transmitted to a central facility containing a data storage device where data indicative of the presence of each device at said location are stored in a database with a time stamp. The facility database is queried for a particular ID of interest, and the particular ID is matched with the owner name assigned to the device.

In yet another aspect, the invention is directed to a physical security system comprising at least one sensor that is continually sensitive to the ID emitters of a variety of electronic communications devices; and a data storage device operatively associated with the at least one sensor, containing all the ID's sensed by the sensor.

Generally, each unique device ID is in unencrypted plain-text such as a MAC address or a TMSI address and the emitted ID's are sensed by a Wi-Fi field associated with a particular location.

BRIEF DESCRIPTION OF THE DRAWINGS

Embodiments will be described with reference to the following figures, in which like numerals represent like items throughout the figures, and in which:

FIG. 5 is a screenshot of the log display panel manifesting the data concerning specific mobile-phone movements selected by the user.

FIG. 6 is a screenshot of the search-parameters control panel displaying the search criteria and filters by which the user can generate logs of relevant data concerning specific mobile-phone movements.

FIG. 7 is a screenshot of the lists control panel displaying the options available to the user for creating and managing personal blacklists and whitelists of recorded mobile-phone users.

FIG. 8 is a screenshot of the blacklist profile page displaying the options available to the user for creating and managing personal blacklist profiles of recorded mobile-phone users.

FIG. 9 is a screenshot of the maps control panel displaying the options available to the user for creating and viewing geographical trail overlays of selected recorded mobile-phone users on maps, Google Street View or local video surveillance inputs.

FIG. 10 is a screenshot of the configuration control panel displaying the options available to the user for managing recording settings for personally owned sensors as well as search-parameter settings governing the corresponding registered personal account for the system user.

DETAILED DESCRIPTION

Figure 1:
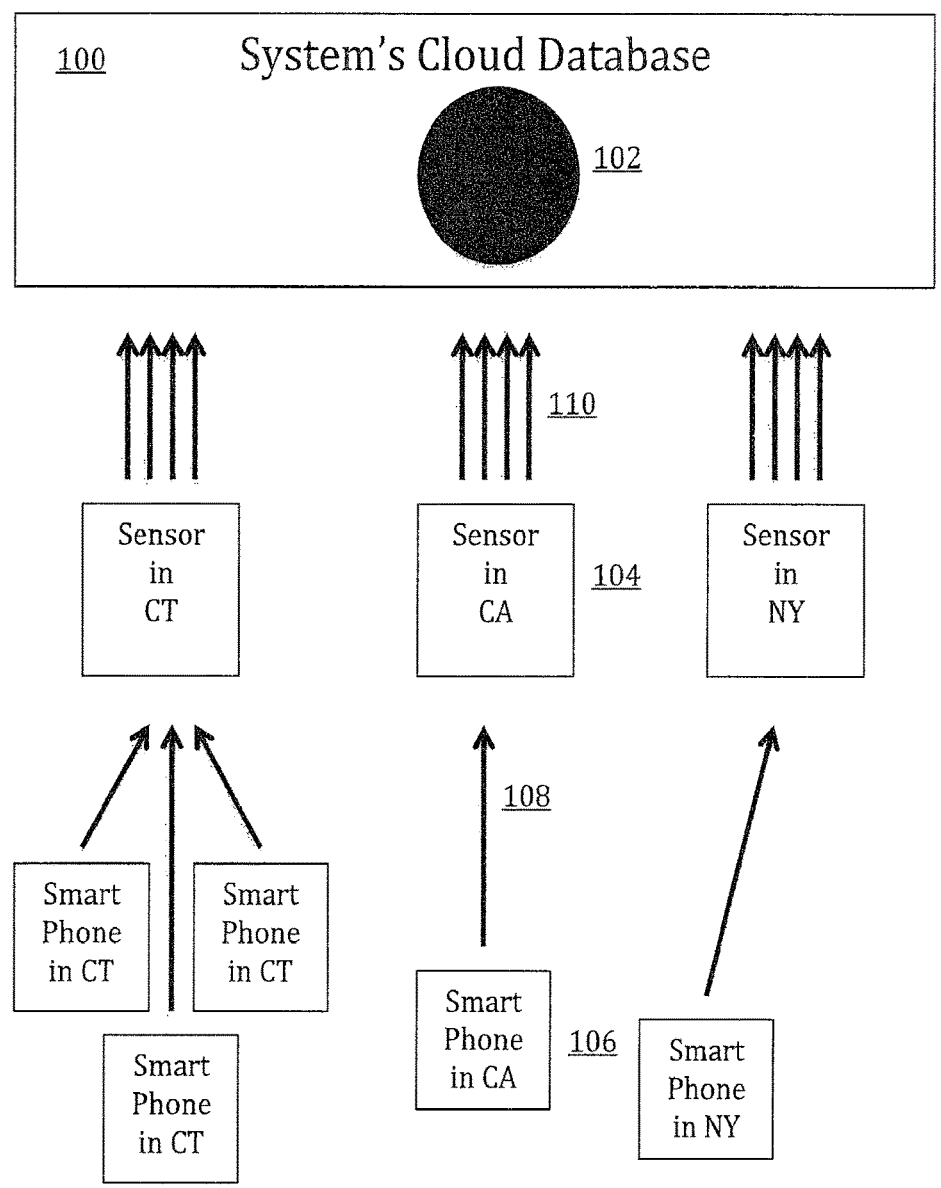
FIG. 1 is a schematic illustration of an exemplary system that is useful for understanding the present invention.
Figure 2:
FIG. 2 is a legend for this schematic illustration.
Figure 2:
Figure 2:
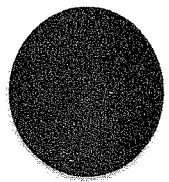
Figure 3:
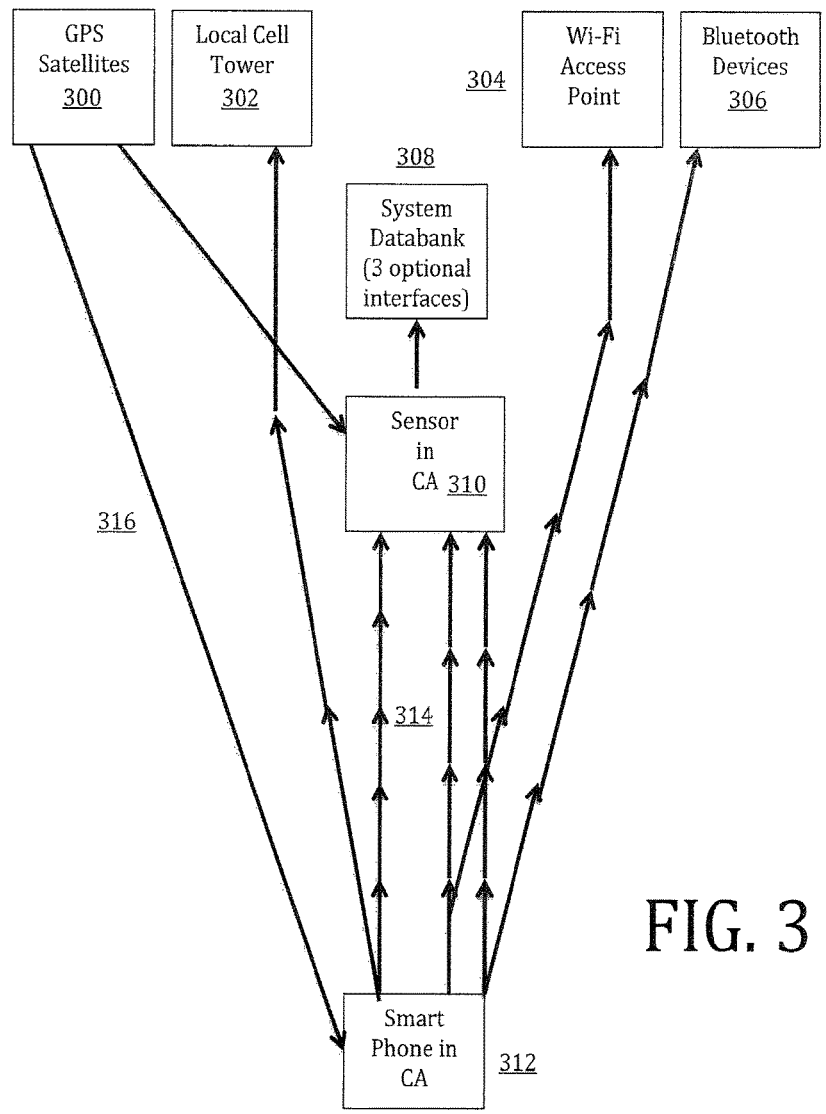
FIG. 3 is a data-flow diagram for the hybrid communications between mobile phones, one of the system's locally deployed sensors, and the system's central database.

Embodiments will now be described with respect to FIGS. 1-10. Embodiments generally relate to systems and methods for detecting the constant unencrypted radio transmissions of mobile phones in order to capture in a cloud-based archive the identities, geographical trails, speeds and motions of most people nearby deployed units.

The system constitutes a revolutionary new physical security system and method that records the digital fingerprint and exact geographical locations of every individual carrying a mobile phone in the vicinity of a deployed sensor. The regularly repeating radio signals from these phones act as portable beacons transmitting unique alphanumeric serial numbers in unencrypted plain text 108. By passively recording these serial numbers 104 and employing a hybrid locational method, the system allows investigators to identify and track the positions as well as the speeds and motions—including criminal perpetrators, their associates and witnesses—carrying a mobile phone who travel within the vicinity of a sensor.

The system has the capability to detect any type of wireless computing device—including tablets and laptops—but the detector primarily serves to identify and track the owners of mobile phones that are regularly carried by the average citizen. Whether a phone 312 is in use or in sleep mode, a single beacon advertising the presence of the device to a cell tower 302, Wi-Fi hot spot 304 or Bluetooth pairing device 306 within the detection radius of a sensor 310 prompts the system 308 to record any unique serial number contained within the data packet. The three types of unique serial numbers that the system can record include the Wi-Fi MAC (Media Access Control) address, the Bluetooth MAC address, and the cellular TMSI (Temporary Mobile Subscriber Identification) for the GSM (Global System for Mobile Communication) 314. For a smart phone enabled to scan for Wi-Fi, the system also records its transmitted configured network list and pins this information to that phone's portfolio. For a wireless device enabled to discover other Bluetooth devices, the system also records its transmitted Class of Device (CoD) and pins this information to that phone's portfolio. In practice, only police who have obtained an ex parte court order may directly access the personal information associated to those unique phone serial numbers that are in fact registered with phone manufacturers and wireless service providers. However, the system users do have access to locational records (such as frequented locations 920 and probable residence 922), personal associates 536 and data acquired from third-party data brokers 742-744 that allow identification of phone owners based on these serial numbers.

The system utilizes two classes of sensors—specialized high-powered detectors sold by the system manufacturer and app-enabled devices already owned by the user. The two forms of sensors operate independently of each other. The specialized high-powered detector constitutes a hybrid identification and hybrid locational sensor that tracks all mobile devices, including smart phones and traditional cell phones, by utilizing three radio modules each connected to a separate directional antennae to receive every regularly repeating unencrypted radio transmission from these devices in range. These radio signals from the mobile phones are intercepted before they arrive at their respective destinations (cell tower, Wi-Fi hot spot or paired Bluetooth device) FIG. 3, which include the anonymizing nodes on the Internet that allow metadata encryption. In this manner, the system prevents criminal suspects from evading electronic surveillance ("going dark") from law enforcement agents attempting to track their movements. By employing the three radio modules to scan the bands associated with the four following types of transmissions, each sensor has the ability to record the unencrypted unique serial numbers of a mobile phone that may include the Wi-Fi MAC address (at both 2.4 GHz and 5 GHz), the Bluetooth MAC address (also at 2.4 GHz) and the cellular TMSI. Any of this identification data that a phone may transmit in range of a detecting the system receiver is saved in a file for that phone stored in the centralized system database and on a backup hard drive inside the sensor itself.

This data is coupled with a record of the phone's changing position discernible through the sensor's hybrid locational method. The system data processing center locates the phone by triangulating these periodic phone signals to geographic positions that are recorded as a series of time-stamped coordinates. These locations can be precise up to within 1-3 meters, depending on the phone's frequency of beacons (known as the "blink rate.") The system accomplishes geographic triangulation by utilizing three or more sensors with directional antennae to identify the common point of signal transmission for a beacon.

Upon arrival each sensor records the beacon's strength (receive signal strength indicator (RSSI)), exact time of arrival for the speed-of-light transmission, and angle of arrival relative to the receiving antenna. By calculating the differences in the signal strength, arrival time and arrival angle for an individual beacon as received by three of more sensors, the system data-processing center can employ industry-standard algorithms to estimate the distance and direction to the phone relative to each sensor. This calculation includes an RF fingerprinting algorithm that compares the sensors' measurements to deviations in the real-time environment caused by physical obstacles (such as people, objects, windows, attenuation and multi-path) between the sensor and the phone that can alter a beacon's signal strength, time of arrival and angle of arrival. The RF fingerprinting of the local environment may be obtained upon installation of one or more local system surveillance units by a physical walkthrough of the area using a handheld spectrum analysis device. Once the system data-processing center determines the relative position of the phone at the time of the beacon's transmission, this locational data is overlapped with GPS data 316 from GPS-coordinate receiving chips located inside these sensors to provide the exact geographical coordinates for the phone that generated the time-stamped beacon event. The sensor's ability 310 to record three forms of identifiable serial numbers for each phone both maximizes its ability to capture useful data for almost every mobile phone in its detection range, as well as allows the sensor to provide the most detailed mapping of a phone's travels by recording its geographical coordinates at the time of every type of its beacon transmissions.

Variations in the ability of the specialized sensors to receive phone beacons necessitate versatility in the placement of a sensor that, in turn, requires versatility in the sensor's interface 310 to the system data-management center 308. Although outdoor sensors can potentially receive signals up to 1.5 miles away, reception quality varies based on environmental obstacles to radio signals, including the indoor or outdoor location of the transmitting phones and the system sensor. Additionally, GSM and Wi-Fi phone signals offer easier reception capabilities than lower-powered Bluetooth beacons. The system sensors include options for 4G GSM and Wi-Fi interfaces for sensor transmissions to the data management center in order to allow flexibility in the placement of sensors so that the user can maximize reception capabilities. However, depending on security considerations (like instances of power outages, cell-phone dampening fields or Wi-Fi interference), the user can connect a system sensor to an optional hardline interface for a high-speed Ethernet cable Internet network.

Figure 4:
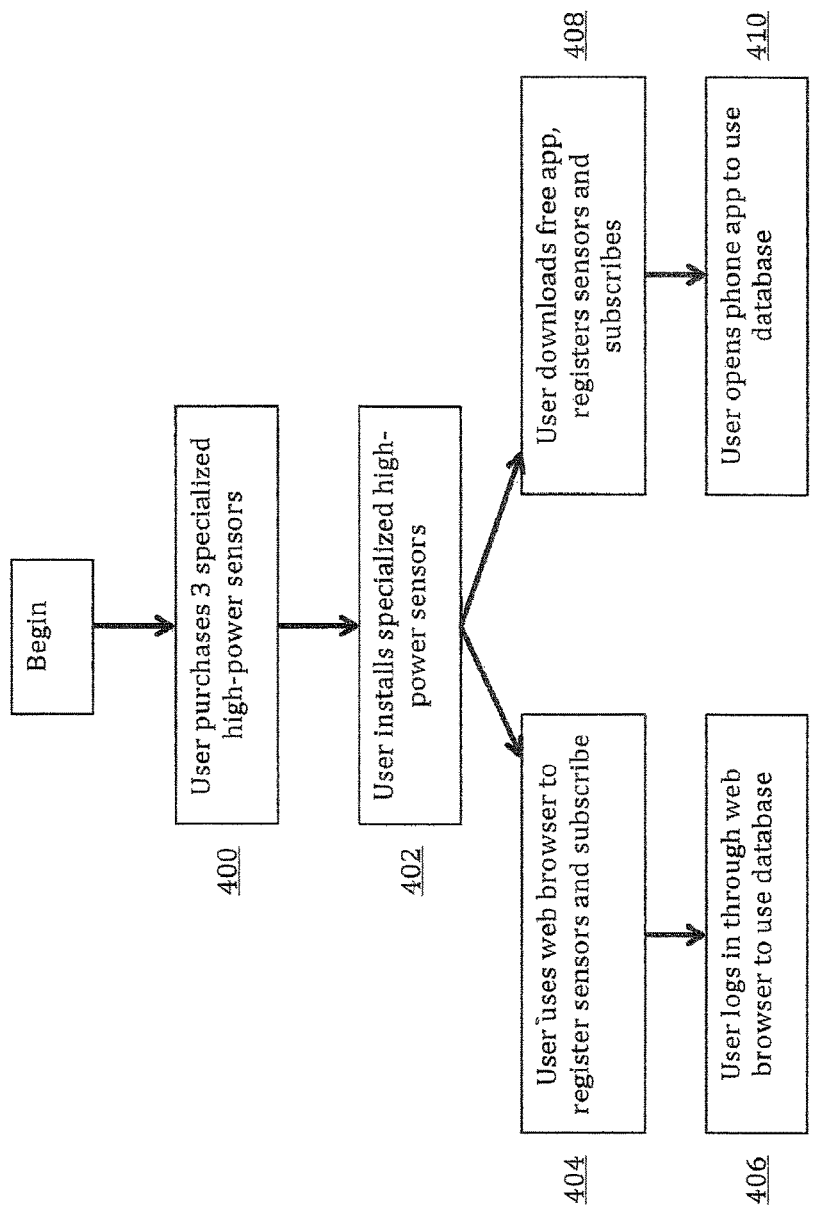
FIG. 4 is a block diagram explaining the local installation process for the system shown in FIG. 1.

Users can install FIG. 4 the hardware for a system surveillance zone without any training. Users of these high-powered specialized sensors purchase 400 three or more units, position them evenly spaced across the property of the surveillance zone, and connect each unit to a power supply 402. If the user has ordered units that require hardline Ethernet connections, the user also connects each unit to a router (which would restrict the liberty to distribute the units far apart.) The user takes note of the serial number displayed on each of the sensors. With the hardware positioned, powered on and connected to the Internet, the user can proceed to activate the local surveillance system by registering the units and activating a registered account 404, 408. Either through the system website or the system app, the user can proceed with this registration and activation by entering required personal information, the serial numbers of the deployed sensors, and the sensor that will serve as the default center of the personal surveillance zone. Once the user completes this process, the sensors begin aggregating data about local phone beacons and the user may access 406, 410 the totality of the system database through the website or app.

In the event that an activated sensor cannot obtain Internet access, either the hardline or the Wi-Fi interface allows the user to access data stored on the backup hard drive inside the sensor. A supplemental generic user interface platform installed on the hard drive allows local-area-network access to this one sensor's data through a standard web browser. When used in this manner as a stand-alone sensor, the system's storage space is limited and the data only includes information captured recently by the one sensor, downgrading the individual system's performance to that of a short-term proximity detector without the advanced data-processing capabilities of the system centralized archive. Available in both stationary and mobile platforms, a system specialized high-powered sensor can function in a broad range of possible venues for deployment as a security solution.

The alternative to the specialized high-powered sensor is an app-enabled general computing device. Capitalizing on the ubiquity of such devices, particularly smart phones, this class of sensor does not require the user to purchase any new hardware. Simply downloading a free app and registering an account 408 allows the user to transform a smart phone, tablet, laptop or desktop computer into a functional system sensor without impairing the device's other functions. Such modern devices include installed interfaces for Wi-Fi, Bluetooth and cellular networks as well as GPS receiver chips. In the cases of laptops and desktops, establishing cellular connections may often require the user to attach an external interface, and GPS positioning may require the user to manually enter fixed geographical coordinates or a physical address. Most smart phones and many tablets already possess all four network interfaces pre-installed, such that these two most mobile devices usually do not even require the two minor modifications to constitute hardware-ready system sensors.

The system app has the potential to remotely enable hundreds of millions of smart phones and other devices to serve as system sensors. By utilizing the four network interfaces and corresponding antennae inside such a device in a "lite" manner that does not significantly impair the other functions of the device, the system crowdsourcing app can simply save a record of serial number beacons and approximate locations of phones detected in the vicinity of the ad-hoc sensor. Records of these geographical trails are anchored to the device's existing record of its own GPS trail or stationary location. Although the diminished power, efficiency and capability for multi-layered data extraction associated with this form of phone sensor compared to the dedicated high-powered system sensor will decrease the amount of detailed information gleaned from the app-enabled scanners, the fact that the system can quickly deploy millions of these sensors compensates for the deficiencies of this class of detector. Moreover, the unparalleled mobility of smart phones can enhance the locational capabilities of the system in that a single detecting phone will move to multiple locations to receive beacon transmissions from a detected phone, including close-proximity reception (when walking passed someone, for instance), to allow enhanced geographical triangulation precision.

The existence of this second class of system sensor enormously increases the customer population and the quality of the central archive. Users who cannot afford a subscription to the database or specialized sensors can nevertheless enjoy a new physical security service that constantly monitors the geographical trails of individuals carrying a mobile phone in the vicinity of the tracking device. Simultaneously, each downloaded app enhances the system databank of geographical trails for identifiable phones with vast amounts of relevant data from every location in the developed world. Individual families can download the system app to as many as five devices in a single home to create a reasonably effective home security grid.

The coupling of specialized high-powered phone trackers with app-enabled detectors creates a daunting global surveillance dragnet that, when enhanced with advanced centralized data processing, can detect and track most criminals. Each sensor receives the identification and locational metadata contained within each beacon from phones nearby 104, saves the information in a temporary archive of recent radio receptions and then transmits this data to a cloud-based archive 100 for centralized data processing. Historical and live data from every locational-tracking system unit worldwide synthesizes together 110 in a cloud-based database for processing of the information recorded from every wireless device detected. The resulting archive is equipped with advanced search filters FIG. 6 designed to accentuate details in this data corresponding to persons of interest in criminal investigations.

Subscribers can access 408-410 this dynamically searchable database to view the composite geographical trails of identifiable individuals locally or worldwide, access FIG. 9 maps of these trails displaying their color-coded speeds and motions, and overlay on these maps the locations of frequented sites 920, probable residence 922 or adjacent video surveillance cameras 918. These trails can also overlay on inputs of local video surveillance feeds 930 or Google Street View 932 for enhanced contextual visualization of an individual's movements and behaviors. After designating surveillance zones and persons of interest, subscribers can receive text-message alerts 726 when blacklisted individuals enter specified locations 728.

A subscriber may choose to enhance the resulting archive of a phone's detailed movements by using a system interface 742-744 to purchase GPS data acquired from these identifiable phones by third-party personal-data brokers (who harvest this encrypted data associated to a phone's identifiable serial numbers). This new information synthesizes with the data in the system central database, but these data enhancements from the third-party data brokers are only accessible through the individual user accounts by which the data was purchased. Locational data aside, subscribers can add to the personal information of a phone's owner stored in their own account by purchasing this type of data associated with MAC addresses or TMSI's from these third-party data brokers. By offering the potential to merge data from multiple data brokers, the system provides users with the most comprehensive insight into the movements of individuals. By harnessing the potential of ubiquitous smart phones and the power of Big Data, the system promises to lead a revolution in physical security services.

Whether connected to the system centralized records database or not, the system sensors can offer owners a wealth of physical surveillance information about detected persons of interest. In cases when the scarcity of deployed sensors around the geographical trail of a person of interest severely limits the corresponding locational data, police usually can still identify the individual simply based on the unique serial number 512 recorded in proximity to the crime scene at the time in question. Most often these unique serial numbers are registered to the owner, allowing police to identify the owner's name, home address, and phone number by utilizing an ex parte court order for this information. While time-stamped TMSI's for specific locations permit police an easy one-step process to identify the phone's owner, MAC addresses can only identify owner's by first querying the network card's manufacturer (identified by the first six digits of the MAC address), followed by the device's manufacturer and/or the owner's wireless service provider.

Police can obtain additional information about the owner and his associates from a search warrant for the identified phone that empowers police to examine the owner's contacts and messages or otherwise surreptitiously activate the phone's microphone (even when the phone is powered off) in order to eavesdrop on any conversations made in the proximity of the phone. In cases when the time of a crime's occurrence remains unknown, the system logs can help investigators to determine this time frame directly by highlighting the periods 511 when an individual was located at the scene of the crime. By employing these investigative methods, an owner of a system sensor can use that single phone-tracker for physical security purposes as a stand-alone system that can function effectively without access to an outside network of system sensors. In other words, prospective system customers need not wait until the manufacturer has deployed thousands of sensors throughout a city before the physical security tool becomes useful—they can immediately begin using an individual sensor the moment they install it to protect that detector's surveillance zone around a home, business or public venue.

The cloud-based user interface is accessible by both owners of system sensors and non-owning subscribers through either a standard web browser 506 or a mobile app 510. In cases when the plethora of deployed sensors around the geographical trail of a person of interest provides adequate corresponding locational data, any investigator without a court order can employ multiple methods for identifying and tracking persons of interests by accessing the centralized system database. The cloud-based system archive automatically stores the logs of an identifiable mobile phone's time-stamped locations for years along with the composite geographical trails of the phone's owner, which are synthesized 110, 102 from the uploads of every system sensor. The user can permanently save 546 all or part of the data for a tracked individual from the cloud-based archive. Furthermore, the user can access 742-744 GPS data and other personal information not recorded in the system database by submitting the unique serial numbers associated with a mobile phone, names, home addresses or a limited range of space-time coordinates in order to purchase corresponding intelligence from third-party personal-data brokers partnered with the system and linked through its user interface.

Partnered data brokers may include industry leaders like Epsilon and Axiom who gather personal data, in part, from third-party data-mining programs embedded in most popular websites, knowingly downloaded apps, surreptitiously downloaded spyware, and smart appliances. These companies offer such surreptitiously collected data for sale publicly. "Location services" provided by companies like Google and Skyhook offer massive historical collections of identifiable mobile phone locations in publicly accessible databanks. Although designed for the purpose of locating Wi-Fi hotspots, in practice these archives include the historical positions of mobile phones that the system could utilize to filter and generate a historical mapping comprised exclusively of mobile phones, which in turn could enhance the system's own archive of this data either through personal-data-brokering partnerships or court orders. Similarly, other personal data collected by Google and Facebook could enrich the system's central databank. Partnered brokers may also include independent open-source researchers who comb social media and other public resources for personal information on individuals. Once a system subscriber purchases such data through the system interface with the data broker, the system then synthesizes this newly purchased information with a new or existing person-of-interest profile and surveillance logs. This new information is saved exclusively on an individual user's account. This new data can expand profiles of blacklisted persons FIG. 8, identify accomplices and witnesses based on space-time coordinates, as well as complete discontinuous GPS trails on maps by illuminating 924 missing segments undetected by system tracking devices. In order for the system to authorize the sale of personal information to a user's account from a data broker, the information has to not be redundant to that contained in system archives and the information has to be fairly consistent with other system data on that subject (such as the Frequented Locations signature and Probable Residence Identifier.)

The user-friendly dashboard FIG. 5-7, 9-10 for the system program allows access 500-502 to the configuration panel FIG. 10 and the log panel FIG. 5. The configuration panel permits the user to alter default settings for the system's recording functions 1000 and search parameters 1002. Configuration options include:

Duplicate Record Interval 1004: The minimum time interval to record identical beacon events generated by the same device (set to 1 second by default)

Time Frame 1006: The time frame for which beacon events will display (by default set to display the system's entire archive for the specified search parameters)

The minimum time interval to display in the log panel identical beacon events generated by the same device (set to 5 minutes by default)

Lingering 1010: The minimum amount of time a device is stationary before the system designates the owner as "lingering" at that position (set to 5 seconds by default)

Rapid Acceleration 1012: The minimum acceleration rate of a phone before the system designates the owner as having performed rapid acceleration in that surveillance zone (by default set to a four-fold increase over the previously recorded speed in one second)

Infrequent/Frequent Visitor 1014-1016: The average amount of time spent and the frequency of visits before the system classifies the phone as either an infrequent or frequent visitor to the surveillance zone Frequent Trajectory Deviator 1018: The minimum distance and minimum number of instances that a phone must deviate from its trajectory within the surveillance zone before the system designates the phone by this classification (By default set to a deviation of 2 meters on 3 occasions)

Associates 1020: The maximum number of meters and the minimum amount of time that a designated phone or a designated phone's other associates must linger within the proximity of another phone (irrespective of the designated surveillance zone) before the system classifies that other phone's owner as an associate of the designated phone (By default set to 1 meter for 5 seconds)

Signal Loss 1022: The minimum amount of time that a phone within a designated surveillance zone ceases to beacon before the system flags that phone for unexpected signal loss (Set to 1 minute by default)

In the case of the infrequent-visitor filter 1014, for example, the user can determine how long and infrequently a tracked phone must visit a designated surveillance zone on average during a specified time frame for the system to categorize that phone's owner as an infrequent visitor to the neighborhood (for example: #<5 minutes per day and #B<7 times per week, #<5 minutes every two days and #B<5 times per week, #<5 minutes per week and #B<3 times per week.) In most cases the default settings 1026 for the sensor's configuration will suffice and the user need not make any changes, although the user can edit the settings and save 1024 these changes at any time.

The log panel FIG. 5 displays the dynamically arranged archive of beaconing events. These search parameters include:

The time that one of the beacons from a particular mobile phone is recorded by the nearest sensor Visit Duration 514: The duration of time that the phone is recorded continuously in the neighborhood or in a specified proximity to the center of the surveillance zone Blink Rate: The time interval between this recorded beacon event and the previously recorded beacon event generated by the same phone, as observed by the sensor(s) closest to the phone.

Duplicate Interval: The time interval between displays of the same form of beacon events generated by the same device.

Serial Number 512: The serial number for the phone transmitted during that beacon event (either Wi-Fi MAC address, Bluetooth MAC address, or TMSI)

Device Location 516: The geographical coordinates of the phone at that time

Velocity 518: The velocity (speed and direction) of the phone at that time

Center Location 520: The center coordinate of the surveillance zone

Proximity 522: The phone's proximity to the center of the surveillance zone at that time Lingering 524: Whether the phone is lingering in the vicinity of a location at that time Stop and Go 526: Whether the phone moves in a "stop and go" motion at that time Rapid Acceleration 528: Whether the phone accelerates rapidly at that time Overlapping 530: Whether the phone moves in a motion that retraces its path at that time Infrequent Visitor 532: Whether the phone is characterized as an infrequent visitor to the neighborhood Frequent Visitor: Whether the phone is characterized as a frequent visitor to the neighborhood Frequent Trajectory Deviator (FTD) 534: Whether the phone frequently deviates from its trajectory during the designated time frame Associates 536: Whether the phone lingers in close proximity to another phone within the designated surveillance zone, or otherwise (if it is a smart phone) shares in common an encrypted network with such another device in its configured network list Signal Loss 538: Whether the unencrypted radio transmissions from the phone cease (as confirmed by all receiving sensors) for a significant period of time while the device remains within the surveillance zone Although the system sensor only records the serial numbers and changing locations of mobile phones, the extensive types of information that the centralized data-processing center can derive from these two forms of data provide investigators a wealth of intelligence on people movements.

Before viewing logs, the user can first select 600 which search parameters to include in the log display by checking or unchecking boxes next to the title of each search parameter located in the search-parameters control panel FIG. 6 adjacent to the log display. Additionally, the user can refine and truncate the displayed list of logged beacon events by designating specific ranges or values for the search parameters entered into filter fields 604 adjacent to the search-parameter titles 602. Aside from the standard search parameters enumerated above, additional filters offered in this control panel include The Average-Speed Filter 646: Limits the logs displayed to those phones that exceed or fail to exceed a designated average speed in a designated coverage zone The Excluded-Phones Filter 648: Excludes from the displayed logs those events generated by phones Having selected search parameters to display and designated any search filters, the user can then save 654 multiple versions of customized parameters for future use or modification 656. By clicking the "Get Logs" button 650 the user opens the customized list of logs FIG. 5.

After the user has generated a refined log list FIG. 5 using the search-parameters control panel FIG. 6, the user can save the log list 546, copy individual phones (an identity folder that includes all phones and serial numbers associated to that owner) to a blacklist/whitelist folder 548-550, and rearrange the logs by clicking on the column titles 511-538 for the search parameters in the log table. Located beside the panels for search parameters and blacklists/whitelists, a panel for maps FIG. 9 offers access to a map of a designated surveillance zone for a specified time frame 904 that can display geographical coordinates, multiple selected geographical trails, frequented locations of selected phones 920 (including probable residence 922), and locations of known video surveillance cameras 918. Users can also superimpose trails on Google Street View 930 or view tagged individuals on local video surveillance feeds 932.

The system subscribers either own dedicated sensors and/or the sensor app or pay for the subscription to access the central database, or else own neither but still pay for the subscription. Subscribers may utilize the premium version of the app to utilize the central database, regardless if they enable the scanning function of the app. Non-subscribing owners of the free the system scanning app will not enjoy the same breadth and depth of features offered to subscribers. Non-subscribers are limited to viewing a rudimentary map display that includes only the serial numbers and geographical trails of those phones detected by their app and up to four other apps who all agree to pool data in a single free account. Regardless of an owner's subscription status, all data on phone movements detected by the app is uploaded to the central database and first processed before app owners can view the data, though in the case of non-subscribers the data is devoid of the feature-rich analytics and massive database accessible by subscribers.

Identifying and tracking persons of interest in an area under surveillance by the system presents no significant challenge to investigators who access the system's cloud-based archive. The system expedites the task of reviewing the dozens or hundreds of logs of people near a crime scene around the time of the crime's occurrence with a series of search parameters and filters FIG. 6 that can limit the log displays only to those relevant for an investigation. Once detectives have properly refined these logs for relevant data, they will likely possess all the information necessary to apprehend the crooks. In addition to the admissible evidence acquired by the system, questioning, search warrants for identified phones, records of credit card transactions along the corresponding geographical trails and video surveillance footage capturing persons of interest at the crime scene or along their travel route can then proceed from this method of narrowing the search for suspects, their associates and witnesses.

If the user enters the system's centralized log panel FIG. 5 before calibrating search parameters FIG. 6, by default the system displays the incidents of phone beacons inside the user's personal surveillance zone (a location designated upon initial account registration). These unfiltered events encompass an unabridged time frame that includes all of the corresponding event logs stored in the temporary archive beginning with the most recent By default the initial view FIG. 5 of the event logs only displays one event per phone, including only the corresponding serial number. A drop-down calendar menu quickly permits the user either to access logs for particular time frames 542 or skip ahead to the next page of logged events 540. Similarly, a "Jump to a Phone" button 544 allows the user to skip ahead to logs of a particular phone's beacons by simply designating the type of serial number and entering the initial alphanumeric digits until the logs for that phone appear on the screen. From this initial log panel the user can also permanently save selected logs 546, access saved logs 547, and place particular phones on a personal blacklist 548 or whitelist 550. The user can quickly generate a list of potential persons of interest relevant to a crime scene simply by clicking the corresponding column-title tabs 511-538 in the log-display panel to arrange logs by search parameters such as event time 511, serial numbers 512 or proximity 522 to a system unit. The array of sophisticated filters accessed through the search-parameters control panel can provide greater precision in narrowing down this list.

The initial view of the serial-numbers field 512 in the log panel FIG. 5 displays the serial number corresponding to each beacon event, and only one beacon event per phone. One option 660 for this search parameter allows the user to display all beacon events for individual phones as contiguous groupings of serial numbers arranged by phone, such that even if the user chooses to arrange the chart chronologically, the logs still display as contained groupings of phone-specific serial numbers (albeit arranged chronologically within each grouping.) Alternatively, the user can name the phone owner during the blacklisting/whitelisting process (described below) so that instead of serial numbers, the initial log panel simply displays the name associated to the owner.

The user can click on the expand arrow adjacent to an individual serial number 512 in the log display panel FIG. 5 to open a drop-down menu displaying exclusively the serial numbers captured for the owner of that phone, grouped by phone if the owner has multiple phones (ex. Phone 1: TMSI=####, Wi-Fi MAC Address=####, Phone 2: TMSI=####, Bluetooth MAC Address=####.) This menu highlights the type of beacon and the serial number corresponding to that particular time-stamped event. Within that drop-down menu another adjacent arrow allows access to a separate window exclusively displaying the logs generated by that individual. By default the log panel in this new window will conform to the same search parameters as the initial log panel (with the exception of the serial number field, of course, and the minimum duplicate time interval.) However, the user has the option to customize search parameters for the new log panel by clicking the search parameters tab 506, adjusting the parameters and clicking the "Update Existing Logs" button 652. Unless the user otherwise specifies 1008, by default on this page the system sets a value of five minutes for the "minimum duplicate time interval" to display events generated by the same device (although by default the system sensors record serial numbers with a minimum duplicate time interval of one second) 1004.

The serial-numbers filter accessed in the serial-numbers search-parameter field 618 allows the user to limit the log display to selected phones. After building a blacklist and a whitelist (discussed below) FIG. 7—or else relying on individual serial numbers directly from event logs 512—the user selects "Blacklist", "Blacklist plus additional phones", "Whitelist", "Whitelist plus additional phones" or "Only pasted phones" from the serial-number filter's drop-down menu. In order to utilize one of the options for directly pasting serial numbers, the user then pastes individually copied serial numbers into the serial-numbers filter's definitive-values field. After the user has selected all desired search parameters and entered any filter values, clicking on the "Get Logs" button 650 will display the chosen logs with only the corresponding phones.

A specialized "MAC-Address Randomizer Detection" monitoring feature for processing periodically randomizing serial numbers automatically identifies instances when a phone's serial number randomizes while in the presence of system surveillance. This feature functions by tracking the continuity of a phone's moment-to-moment locations, velocity, trajectory and its other serial numbers along a contiguous geographical trail. Additional criteria for this classification include the consistency of the Frequently Visited Locations signature, Probable Residence Location, and Configured Network List signature associated to multiple serial numbers. In this manner the system can group together multiple randomized serial numbers belonging to the same phone for purposes of unified identification and the creation of composite geographical trails of the phone owner.

In order to prevent MAC-address spoofers from littering the system archive with surfeit fake serial numbers, the system limits the number of serial numbers it records to nine of each type per cubic meter per second. For the same reason, the system by default limits the time interval to record duplicate events generated by the same phone to one second. When a randomized MAC address appears in the initial log display panel, the serial number is followed with the designation "(Random)." Spoofed MAC addresses that replicate an address of another recorded phone are marked as spoofed copies with alphanumeric designations in parenthesis (ex. (A), (A1), (A2) . . . (M8), (M9), (N1) . . . (ZZ1, ZZ2, ZZ3)), and the phones themselves are identified as employing fake serial numbers with the designation "(Fake MACs)" next to the phone title.

The serial-number field 512 includes access to additional identifying information transmitted in plaintext within phone beacons for MAC addresses. By clicking on an arrow adjacent to Wi-Fi MAC addresses on a log page exclusively for a single phone owner, the user can view a drop-down menu displaying the corresponding Configured Network List (CNL.) Bluetooth MAC addresses for mobile devices that are not phones include a parenthetical designation identifying the Class of Device (CoD) (headset, tablet, etc.). Conversely, Bluetooth MAC addresses for mobile devices that are mobile phones do not include any CoD designation (since all devices displayed in the archive are presumed to be phones unless otherwise indicated), though the system saves this information along with the phone's other serial numbers to aid in the process of identifying the mobile device as a phone eligible for inclusion in the main system database. Similarly, the name of the manufacturer of the Wi-Fi interface card identified by the first six alphanumerical digits of the corresponding MAC address can often help determine if the device is a mobile phone since some of these manufacturers generally manufacture cards exclusively for specific devices, such as smart phones. For example, HTC Corporation usually only manufactures Wi-Fi interface cards for mobile phones, whereas Linksys usually only manufacturers cards for stationary devices.

The system designates recorded wireless devices that appear to be stationary as irrelevant for tracking until otherwise indicated. The system saves these serial numbers to a separate database for stationary wireless devices. The data processing center arrives at this classification based on several criteria, including if the device Lacks a history of significant movement Does not appear to emit a TMSI Appears to be irrelevant for reliably tracking an individual based on its Bluetooth CoD (such as desktop computers, wireless access points, etc.)

The Wi-Fi MAC address itself (when not spoofed) includes an industry-standard code that identifies the network card's manufacturer as one that usually only sells cards for stationary platforms and not mobile devices Users may conduct locational searches of this separate database for the purpose of associating such stationary platforms to recorded phone owners as "possible other wireless devices owned by the same person." These pairing designations are only saved to a subscriber's private account, not the public database.

A blacklist/whitelist control panel FIG. 7 permits the user to save the identifying data for selected mobile phones from logs to a specially designated group for suspicious individuals or approved individuals. The subscriber can utilize these lists when searching through logs through the serial-number field 618 in the search parameters control panel, as well as request text-message alerts 726 when such individuals engage in certain suspicious behaviors detected by the system. Having added individuals to a blacklist, the user can then create profile pages FIG. 8 for high-priority blacklisted persons of interest that include information gathered independently, through system detection and from partnered third-party personal-data brokers. Such a profile page includes one-click access to all saved logs 803 and maps 805 related to a surveillance target, as well as the person's probable residence (which the user can alter) 802, frequented-locations-routine signature (viewable on a map) 807, and text-alert events related to this individual 808. An automatic update utility regularly revises the automatically populated data fields when the system newly identifies such data, including new phones used by the blacklisted individual.

A blacklist and whitelist are exclusively intended for the private use of the subscriber who creates the list. As with the whitelist (which does not include corresponding profile pages), the blacklist and corresponding profiles are not saved to the publicly accessible database. Instead each list and profiles are only viewable from the private account of the subscriber who generated the list. However, users may share 806 these list and profiles with other subscribers who may then view the information on their own accounts.

The system automatically sends text-message alerts to a subscriber of the online database when individual persons of interest whom they have blacklisted 548—such as terrorist suspects, sex offenders, drunk-driving offenders, drug offenders, stalkers or subjects of a restraining order—and for whom they have requested text alerts 726 enter specially selected 728 surveillance areas or otherwise enter the selected proximity 730 of specially designated phones in the presence of system surveillance. Subscribers can designate these no-go zones by Manually entering a physical address or pasting geographical coordinates that specify the center of the surveillance zone, Pasting in a serial number of one or more mobile smart phones (which may include members of the whitelist or other members of the blacklist, such as the phones of known Al Qaeda suspects, criminal associates or felons), Selecting from a registry of no-go zones that may include the subscriber's own system sensors along with a catalogue of public locations grouped geographically—such as gun stores or gun shows for felons or terrorist suspects, childcare centers for sex offenders, bars and liquor stores for drunk driving offenders, etc.

Subscribers can designate multiple surveillance zones in which to monitor a group of blacklisted individuals, while also individualizing some surveillance zones for other people on the blacklist.

Users may choose one or more security zones for an individual by first entering a physical address or pasting geographical coordinates, and then linking to a map that displays the site with the corresponding property highlighted by default. The user has the option to expand or contract the zone by a designated number of meters, or else manually select the zone by highlighting a preferred location with one or more sizing rectangles. If selecting a surveillance zone without referring to a map, the user completes the area designation by entering a value for the radius of the zone. The user then saves this zone selection and has the option to create additional zones for patrolling the blacklisted individual.

The blacklist feature is not limited to subjects of surveillance whom the user has personally identified. Aside from blacklisting individuals on a case by case basis, the user has the option to blacklist entire groups of people based on certain state or national public registries, including those for sex offenders, terrorist suspects and violent felons. Alternatively, the user can blacklist selected associates of other blacklisted individuals. Beyond blacklisting criminal suspects based on personal identity, the user can blacklist people based on detected suspicious behaviors. The act of speeding, loitering, backtracking or circling in areas designated as behavior-based blacklist surveillance zones (either in the proximity of specified locations or whitelisted people) at designated times can trigger the system to send text message alerts to the corresponding subscriber. The subscriber may also choose to receive such alerts when a blacklisted phone owner begins to use a new phone.

Information contained within these text alerts includes

The known name or given alias of the person (if available)

Identifying serial numbers of the phone,

The location of the individual (both the geographical coordinates and the proximity to the center of the corresponding surveillance zone)

A link to a map plotting the location of the person in relation to the center of the surveillance zone A link to a privately accessible profile page FIG. 8 for that blacklisted individual The time of the first detected geographical violation that triggered that text alert The time duration of the violation up to the present moment Any relevant recorded behaviors exhibited by the subject The system only sends these text alerts to subscribers who have specifically requested 726 such alerts through the blacklist/whitelist control panel. Merely including individuals or groups on a blacklist or whitelist does not automatically prompt the system to send to that subscriber alerts about their suspicious movements. An auxiliary feature of this geographical-restriction phone-monitoring service records a separate redundant set of logs for blacklisted trespassers and restricted (whitelisted) travelers each time that they enter or depart designated surveillance zones, privately accessible 738-740 through the corresponding list control panel.

Alternatively, subscribers can designate individuals for the whitelist 704, such as parolees, persons of interest to an investigation or loved ones and associates. The system monitors these people by utilizing an inverse version of the blacklist text-message-alert service that alerts the subscriber by text message when preselected 732 phones depart designated surveillance zones. These locations can include residences, commercial properties, neighborhoods, cities, states, countries or the fluctuating coordinates of mobile system detectors. Whitelist designations can also assist users searching logs by filtering the logs through the serial-number field 618 in the search parameters control panel based on the whitelist.

The serial-number search parameter constitutes just one of several serial-number-based search parameters. The infrequent-visitor search parameter 636 identifies those individuals whom the system infrequently records within a designated surveillance zone and time frame. The corresponding filter limits the logs displayed to only these individuals. The user simply selects the "Enable" option in the filter panel's drop-down menu for infrequent visitors in order to activate the feature.

If necessary, the user can alter 1014 the default recording-time frequency that defines an "infrequent visitor" from the configuration control panel FIG. 10. Another option in the infrequent-visitor 636 drop-down menu in the search parameters control panel labeled "Enable with blacklist" also includes in the log display any phones from the blacklist that are not already classified as "infrequent" visitors. Once a list of these infrequent visitors displays in the log panel, the user can then examine 516, 906, 926 the geographical trails of these potential persons of interest—including the location and duration of their stops in the neighborhood as well as suspicious movements—for leads to suspects, their associates and witnesses during selected time frames. Perpetrators who power off their phones at crime scenes but not before they have entered system surveillance zones, as well as lookouts and friends of suspects in the vicinity, would be particularly vulnerable to this form of detection through the signal-loss indicator field 538.

Other filters amplify this capability for truncating system logs based on serial numbers. The excluded-phones filter 648 allows the user to omit from the log display FIG. 5 those records of phones (such as residents, neighbors, friends and servicemen) that they have designated as irrelevant to an investigation. This features operates similarly to the serial-number filter 618, only it excludes rather than includes selected phones. The user may begin this exclusionary filtering process by selecting phones to populate the whitelist 550.

The control panel 704 for this whitelist permits the user to include automatically all frequent visitors 720, as well as to add or to remove pasted serial numbers 712. The user can first employ an inverse version 638 of the infrequent-visitor filter called the frequent visitor filter to display exclusively a list of frequently recorded phones in the neighborhood in order to identify individuals such as residents and neighbors who are often present in the area. The user can then manually determine whether certain phones not identified as "frequent" visitors are nevertheless appropriate for the whitelist by surveying (either in log form or on a map) the historical geographical locations of the phones and correlating this data with the concurrent locations of known individuals. After building a whitelist 712 and/or copying individual serial numbers directly from event logs 550, the user selects "Whitelist", "Whitelist plus additional phones" or "Only pasted phones" from the excluded-phones filter's drop-down menu 648 in the search parameters control panel. In order to utilize either of the latter two options, the user then pastes any individually copied serial numbers into the excluded-phones filter's definitive-values field.

Conversely, the user can expand upon a list of persons of interest with the associates filter 642 in order to identify criminal accomplices and witnesses. The associates search parameter indicates whether a recorded individual(s) has possible associates within the designated surveillance space-time zone based on whether the person(s) lingers in close proximity to another recorded individual(s) during the selected time frame. Additionally, the classification includes recorded individuals (matching the other specified search criteria) who share in common one or more encrypted networks in the configured network list (CNL) that phones transmit in plain text during Wi-Fi beacons. The user can change 1020 the default length of time and proximity for this "associates" designation by altering the "lingering" setting in the configuration control panel.

By inputting one or more serial numbers into the definitive-values field for the associates filter 642, the user generates exclusively a listing of such suspected associates. Instead of manually inputting individual serial numbers, the user can opt to select a grouping of phones from the range field for the associates filter. These options include "Same as serial-number filter", "Blacklist", "Infrequent visitors", "Blacklist plus additional phones", "Infrequent visitors plus additional phones", "Blacklist plus infrequent visitors", or "Blacklist plus infrequent visitors plus additional phones." The collection of logs produced by the associates filter also includes phones that linger close to any of the phones identified as associates of the specified phone(s). The user can also choose an option 662 to limit the display of event logs exclusively to all phones associated with others in the vicinity without specifying any phones of interest Once a log panel displays based on the associates filter, an option allows the user to open a new window displaying frequent associates of a highlighted phone for a designated time frame, independent of any geographical-zone restrictions.

When the user employs the associates filter, a beacon event generated by such an apparent associate displays below a concurrent beacon event generated by the corresponding suspect FIG. 5. Even if an associate does not match other search criteria established by the filters (aside from time frame and location, upon which the designation of "associate" is based), the associate would still display in these customized event logs. The list of event logs produced from the associates filter delineates groupings of associates with an outlined border encircling related events. By default the events shown in the primary log display window produced using the associates filter correspond to times when the associates linger in close proximity to each other.

Filters based on time and geographical location provide another set of criteria by which to limit the beacon logs displayed to only those relevant for an investigation. For windows displaying the log records exclusively for individual phone owners, the user can alter the default value of five minutes for the time interval between displayed duplicate beacon events (two or more particular forms of beacons attributed to the same device.) The user can make this change by entering longer time intervals (such as five seconds, ten seconds, one minute, two minutes, etc.) in the definitive-values field for the duplicate interval 614 in the search-parameters control panel. In this manner the user can shorten or expand the lists of events displayed in these logs of beacon incidents. Notably, this alteration of the displayed duplicate interval does not change the recording configuration of the system unit, which will continue to record duplicate events at an interval of one second (unless the user modifies this setting in the configuration control panel) 1004. One option 660 in the duplicate-interval field 614 segregates logs of beacon events generated by the same device into groupings of distinct visits. With this option enabled, the user can quickly ascertain which events correspond to particular visits for devices that come and go on multiple occasions within the detection zone.

Other time-based filters include the time frame for events displayed 610 and the duration of time 612 that a device is continuously recorded in the designated surveillance zone. The user has the option to limit the duration filter to individuals detected within a reduced radius specified in the proximity filter 626. With this proximity value reduced, the amount of time displayed in the duration field of a log is decreased from the time duration previously shown for the default proximity, because the individual will have necessarily spent less time in close proximity to the zone's center coordinate 624 than he spent in the entire neighborhood. This proximity adjustment allows the user to determine quickly the amount of time certain individuals linger in close proximity to the heart of the surveillance zone—which for many investigations is a criminal indicator far more relevant than the amount of time individuals linger in the entire neighborhood.

The blink-rate field 616 indicates the average time delay between beacons received by the closest sensor to the phone that generated the beacon event. This time delay varies by receiver type, signal type, phone manufacturer and varying environmental conditions that may obstruct the signal between the originating phone and a sensor. The cellular TMSI beacon constitutes the least frequent signaling beacon with a blink rate of up to 7 minutes. Wi-Fi varies from several times per second to 5 minutes, and Bluetooth (the technology among this set that has the greatest variety of physical uses) varies from multiple times per second to seven seconds. By knowing how frequently the system on average receives beacon signals from a given phone, the user can determine roughly the precision of the geographical trail (along with other location-based metrics) and whether a suspect actually entered a crime scene.

Apart from time criteria, space-time filters include proximity 626 and the center coordinate 624. The user can limit the log display to events within a defined proximity to the center coordinate (less than the default proximity, which is the entirety of the locally central unit's surveillance range.) Additionally, the user can change the center coordinate from its default location (the GPS coordinate of the system unit designated during the registration process.) In this manner, the user can focus the investigation on particular zones of interest.

One series of search parameters displays logs of speed-based values calculated from space-time records. The velocity meter 518 automatically records an individual's direction and speed every second (if possible.) The speed value (by miles per hour) is defined as the quotient of the distance between the presently recorded location and the immediately previous recorded location divided by the travel time ((X2−

X1)/T). The precision of this calculation depends on the blink rate (ideally as low as one second) and the accuracy of the geographical location for the corresponding beacons measured by the system. The velocity filter 622 limits log displays to events when the speed either exceeds or fails to exceed a defined speed entered into the corresponding definitive-values field.

The average-speed filter 646 offers a further enhancement for narrowing down the list of persons of interest by categorizing recorded individuals according to their average speed of travel through a designated surveillance zone at a given time frame. The average-speed filter uses the moment-to-moment velocity records in order to calculate the average speed of an individual ((V2−V1)/T). The filter then lists the phones corresponding to visits that either exceed or fail to exceed a defined average speed. Apart from helping investigators to identify individuals who move unusually slowly or quickly around a crime scene, these speed-related filters can aid in investigating serious motor vehicle violations.

A series of motion-detecting search parameters—including the rapid acceleration monitor 632, the overlapping monitor 634, the stop-and-go monitor 630 and the lingering monitor 628—identify such anomalous movements during an abbreviated time frame within a designated surveillance zone. Logs filtered based on these criteria display only those events that exhibit such anomalous behaviors. All of these motion-detecting monitors function based on measurements derived from the speed and trajectory recorded by the velocity meter 518. The frequent-trajectory-deviator filter 640 detects individuals who frequently change travel direction, but (like the infrequent-visitor monitor and the average-speed filter) represents an average value calculated from multiple records of beacon events. Employing one or a combination of the speed and motion filters, investigators may easily distinguish suspects as persons moving in suspicious manners—either excessively slowly, excessively quickly, in a meandering or distracted fashion, or retracing their paths—around a crime scene at the approximate time of its occurrence.

The signal-loss search parameter 644 can identify premeditating criminals in range of system detection who power off their phones or otherwise disable their beaconing prior to entering a crime scene in order to evade system surveillance at that particular location. The corresponding filter limits the displayed logs to phones that the system ceases to detect for an extended period of time even though the phone has not departed the surveillance zone. If an otherwise suspicious manifests this behavior, the user can then view 926 the phone's historical geographical trail on a map in order to ascertain whether the cessation of detection was likely due to the phone's entry into a building that dampened its signal, or due to the owner's purposeful disabling of the phone's signal. If necessary, the user can utilize the system's cloud database to extend the surveillance zone by altering 626 the proximity value in order to locate criminals retroactively who had power off the phone or disabled its beaconing well before approaching the crime scene.

After defining ranges or values for one filter, the user can narrow the log list further by specifying ranges or definitive values for additional filters—such as a new time frame 610 (if the desired time frame is shorter than the default time frame, which is the entirety of the available archives) and a new proximity radius 626 around a particular set of coordinates 624 for the surveillance zone (if the desired radius is different from the system device's default surveillance radius.) Upon selecting 600 the activation boxes for all desired search parameters and entering any ranges 604 or definitive values 606 for filters, the user simply clicks the "Get Logs" tab 650 to view the customized list of beacon events. By feeding a list of logs through multiple specially selected filters simultaneously, the user can limit the log display to information that is likely relevant to an investigation. The user can then arrange and rearrange the filtered logs according to any of the selected search parameters by clicking on the corresponding column title 511-538 in the log-display chart FIG. 5. Upon identifying persons of interest, the user can view the statistical geographical trails 516 and proximities 522 of these individuals listed chronologically in columns alongside records of the corresponding serial numbers 512 saved every second 511 while the mobile phone remained within the detection radius. At any time the user can permanently save 546 customized logs with the capability for dynamic rearrangement according to selected search parameters.

After the user has identified persons of interest by first employing selected search parameters and log filters FIG. 6 and then adjusting the arrangements of the displayed logs FIG. 5 to best suit a visualization of the geographical trail 516, the user can then view maps 926-928, Google Street View 930 or video surveillance inputs 932 in order to learn new relevant information about these subjects or otherwise better visualize known data. Accessible through the toolbar menu (500-510 on FIG. 5-7, 9-10), the geographical-trail map 516 permits the user to view an individual's route visually, complete with color-coded speed-and-motion tracking that specifies when and where people move quickly, move slowly, stop or retrace steps. The trails of phones 914-916 highlighted in the log panel FIG. 5 for a designated time frame 914-916 appear overlaid on a geographical map of the designated area at an adjustable magnification 912. Analogous to street-traffic maps, color-coded sections of the trail approximate the velocity of moving devices and the time duration that stationary devices remain at a particular location. A green trail segment indicates steady movement through a GPS coordinate, yellow indicates particularly slow movement, orange indicates temporary stopping, purple indicates overlapping, and red indicates prolonged stopping. In this manner, the user can employ a visually oriented display to identify easily individuals who are moving slowly or otherwise suspiciously around a crime scene at the approximate time of a crime's occurrence such that these individuals may be considered persons of interest to an investigation.

Other map-related features allow the user to gather additional visually oriented information about subjects whom they have identified from filtered logs. One constantly enabled function available on the maps permits the user to view the GPS coordinates of locations when they click on the corresponding area of the map. The user can copy such an identified coordinate and paste it into the definitive-values field for the center coordinate filter 624 in order to redefine a surveillance zone around a new local coordinate. If the area in the map clicked on is part of a geographical trail, the phone's serial numbers, speed and time (or, for stationary devices, the time frame) of the individual at that point also display alongside the coordinates. The user can supplement incomplete geographical data recorded in the system archive by submitting 924 known serial numbers, names, home addresses or partial geographical trails in order to purchase the missing information from third-party personal-data brokers partnered with the system and linked through the user interface. Once purchased, such additional data manifests on the map of a discontinuous geographical trail to populate some or all of the missing segments of the owner's path.

Multiple site-locator overlays provide additional information on the identities and travels of selected individuals. One optional feature 918 overlays the geographical trails of identified persons of interest with a map of the locations of known video surveillance cameras along that route, allowing users to requisition all known surveillance cameras in order to facilitate a criminal investigation. Another map feature 920 highlights the locations anywhere in the world where a selected phone is frequently recorded by the phone-surveillance system. A sub-service of this feature displays on the map the frequented-locations-routine signature trail of the individual, unique identifying data that the data-processing system itself uses to help identify and unify multiple records of phone beacons.

By clicking on one of the frequented sites, the user can view an informational pop-up display that includes the name and address of the location (acquired from a public GPS-based address registry and reverse-address lookup), the average time of week and day and duration that the subject visits the site, as well as an option to view the times of most recent visit arrivals and departures. Another sub-service of this feature is the probable-residence identifier 922, which extrapolates from the duration and time of average daily visits where the subject most likely resides. A reverse-residential-address lookup automatically ascertains the individual's probable last name and displays this information when the user clicks on the location. From this pop-up menu the user can click a "Save Name and Address" button to populate any corresponding fields in the Blacklist FIG. 8 and phone-owner profile (displayed in the serial-number field 512 on logs) with this information for that subscriber's account. The real-time location tracker 923 quickly highlights the last recorded location of an individual and, once enabled, proceeds to draw a trail on the map corresponding to the subject's changing locations. The user can save 928 any of these maps for later review and sharing (through the Blacklist Profile Page 806) with other subscribers.

Aside from the maps, the user can overlay the selected geographical trails on a picture of the designated location from Google Street View 930. Alternatively, the user can input 932 a digital video surveillance feed from either a personally owned video surveillance system or a different one accessible remotely over the Internet. To set up initially a video feed input for an overlay of the selected geographical trails, the user first uses a screenshot of the feed to identify the area on the video where at least one of the sensors is located. The user can accomplish this task by temporarily placing one or more app-enabled phones in the video surveillance zone. After any user completes this setup process once, any future user with access to the video feed can overlay trails on the video by simply clicking on the video button in the maps panel. This action displays subjects caught on video tagged with color-coded markers corresponding to the name (if available), serial numbers and probable residence listed on a side panel adjacent to the video feed.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with or substituted for the components described herein while the same or similar results would be achieved. All such similar substitutes and modifications apparent to those skilled in the art are deemed to be within the spirit, scope and concept of the invention as defined.

The invention claimed is:

1. A method for identifying the owner of a mobile communications device that emits a unique device ID assigned to the device by a source authority such as the device's network card manufacturer or wireless service provider, comprising:
   at a known geographic location having an ID sensing field, continually sensing any ID emitted within the field by any number of devices;
   transmitting the sensed ID's to a central facility containing a data storage device where data indicative of the presence of each device at said location are stored in a database with a time stamp;
   querying the facility database for a particular ID of interest; and
   matching the particular ID with an owner name and home address assigned to the device, wherein
   matching the particular ID includes querying another database containing a multiplicity of ID's and the name associated with each ID;
   the other database is controlled by one of (a) the manufacturer of the device, (b) an ISP provider, (c) a Website operator, or (d) a personal data collection enterprise;
   a multiplicity of ID emission sensors are distributed among a plurality of sensing fields, for continually sensing the ID of every emitting device in the respective sensing fields;
   querying the facility database for any data associated with a particular ID sensed at a first known geographic location;
   if such association is found, querying the database for the subsequent presence of said ID sensed in at least a second geographic location; and
   if such subsequent presence is found, generating an output indicative of the time-dependent geographic movement of the device between at least said first and second locations.

2. The method of claim 1 wherein
   a camera is located at said known geographic location;
   the camera records a suspicious person at the location, during a particular time period; and
   the querying of the facility database for an ID of interest includes identifying each ID that was sensed at the geographic location during said time period.

3. The method of claim 1, wherein
   the last name and home address of the individual carrying the emitting device is derived from assessing the regular timing and duration of the individual's visits to sites classified as frequently visited locations;
   the time-stamped recorded locations frequented by the emitting device's owner comprise a unique geographical signature by which an investigator can identify the owner.

4. The method of claim 1, wherein the unique ID is in unencrypted plaintext and the identifying data recorded by each sensor includes any Wi-Fi configured network list or any Bluetooth class of device.

5. The method of claim 1, wherein if the recorded unique device ID for a mobile device is altered by the owner, the data-processing system tracks the owner based on at least one of (a) the temporary continuity of one or more of the mobile device's unique device ID's, (b) the geographical alignment of the multiple unique device ID beacons emitted by the device, (c) the continuity of the recorded geographical trail and trajectory along predefined travel routes, and (d) the consistency of the configured network list emitted in the device's Wi-Fi beacons.

6. The method of claim 5, wherein the data-processing system identifies the owner based on a temporal analysis of his frequented locations recorded by multiple sensors.

7. The method of claim 1, wherein
the data-processing center identifies stationary wireless devices recorded by the sensors and saves the corresponding data to a separate database from that reserved for mobile devices;
the data-processing center determines this classification as a stationary device based on a series of criteria including at least one of: (a) the historical record of the device's locations indicates the device has not moved appreciably, (b) the device has not emitted a TMSI beacon recorded by the system, (c) the Bluetooth class of device data classifies the device as a stationary type of wireless device, (d) the first six digits of the Wi-Fi MAC address denotes a Wi-Fi network card manufacturer that usually does not manufacturer Wi-Fi interface chips for mobile devices.

8. The method of claim 1, wherein
each unique device ID is a MAC address or a TMSI address; and
the emitted ID's are sensed by a GPS-enabled detector capable of receiving cellular, Wi-Fi and Bluetooth signals associated with a respective location.

9. The method claim 1, wherein
the data-processing center identifies multiple forms of unique device ID's for a single mobile device as belonging to said device and then records the corresponding records in a folder designated exclusively for the owner of that device;
the data-processing center identifies multiple mobile devices belonging to a single owner as belonging to said owner and then records the corresponding records in a folder designated exclusively for the owner of that device.

10. A physical security system comprising:
at least one sensor that is continually sensitive to the ID emitters of a variety of electronic communications devices; and
a data storage device operatively associated with the at least one sensor, containing all the ID's sensed by the sensor, wherein
a first sensor is situated at a first known geographic location;
a second sensor is situated in at least a second known geographic location; the first and second sensors are operatively associated with respective digital processors for transmitting data indicative of the sensed ID's, over a global communications network;
a central facility remote from the first and second geographic locations is operatively associated with said global communications network, for receiving the data indicative of the sensed ID's and recording data indicative of the presence of any devices at each of the first and at least second locations,
the system includes an operator interface at the central facility, for querying the facility database for a particular ID of interest and matching the particular ID with an owner name assigned to the device, the interface including means for matching the particular ID by querying another database containing a multiplicity of ID's and the name associated with each ID, and said another database is controlled by one of (a) the manufacturer of the device, (b) an ISP provider, (c) a Website operator, or (d) a personal data collection enterprise.

11. The system of claim 10, including a data facility that creates a searchable databank for paid subscribers designed to facilitate criminal investigations by illuminating the precise geographical trails and movements of persons carrying mobile phones and utilizing search parameters that truncate the data stream in order to display only that data relevant to the investigation.

12. The system of claim 11, including a display device for imaging the sensed locations and overlaying geographic trails of a mobile phone.

13. The system of claim 12, wherein the location images are maps, the geographical trails are overlaid on the maps, and the trails include color-coded speed and movement indicators.

14. The system of claim 12, wherein the location images are maps, the geographical trails are overlaid on the maps, and the system includes a user controller to overlay the maps with at least one of (a) highlighted sites frequently visited by the owner of a recorded device, (b) the sites of known video surveillance cameras along the displayed geographical trail of the mobile device, (c) a highlighted marker designating the device owner's probable residence.

15. The system of claim 11, including the capability to blacklist selected detected individuals, groups or suspicious behaviors from entering designated surveillance areas or whitelist selected detected individuals from departing designated surveillance areas through the use of text-message alerts.

16. The system of claim 11, including the capability to discern infrequent visitors to the designated surveillance area as well as associates of detected individuals.

17. The system of claim 10, in which the sensors are a combination of dedicated high-powered detectors and app-enabled smart phones.

18. The system of claim 10, wherein
each unique device ID is a MAC address or a TMSI address; and
the emitted ID's are sensed by a GPS-enabled detector capable of receiving cellular, Wi-Fi and Bluetooth signals associated with a respective location.

* * * * *